US012359058B2

(12) United States Patent
Griebel et al.

(10) Patent No.: US 12,359,058 B2
(45) Date of Patent: Jul. 15, 2025

(54) TEMPERATURE STABLE POLYMERIC BLENDS FOR USE IN NON-PNEUMATIC TIRES

(71) Applicant: Bridgestone Americas Tire Operations, LLC, Nashville, TN (US)

(72) Inventors: Jared J. Griebel, Orange Village, OH (US); Hyeonjae Kim, Copley, OH (US); Bret J. Chisholm, North Canton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 764 days.

(21) Appl. No.: 17/597,792

(22) PCT Filed: May 18, 2020

(86) PCT No.: PCT/US2020/033386
§ 371 (c)(1),
(2) Date: Jan. 24, 2022

(87) PCT Pub. No.: WO2021/021274
PCT Pub. Date: Feb. 4, 2021

(65) Prior Publication Data
US 2022/0243052 A1 Aug. 4, 2022

Related U.S. Application Data

(60) Provisional application No. 62/879,600, filed on Jul. 29, 2019.

(51) Int. Cl.
| | | |
|---|---|---|
| *C08L 67/02* | (2006.01) | |
| *B60C 7/14* | (2006.01) | |
| *C08G 63/183* | (2006.01) | |
| *C08G 63/189* | (2006.01) | |
| *C08G 63/66* | (2006.01) | |
| *C08G 63/91* | (2006.01) | |
| *C08G 77/20* | (2006.01) | |
| *C08G 77/28* | (2006.01) | |
| *C08J 3/12* | (2006.01) | |
| *C08K 5/1515* | (2006.01) | |
| *C08K 5/5425* | (2006.01) | |

(52) U.S. Cl.
CPC .............. *C08L 67/02* (2013.01); *B60C 7/146* (2021.08); *C08G 63/183* (2013.01); *C08G 63/189* (2013.01); *C08G 63/66* (2013.01); *C08G 63/918* (2013.01); *C08G 77/20* (2013.01); *C08G 77/28* (2013.01); *C08J 3/12* (2013.01); *C08K 5/1515* (2013.01); *C08K 5/5425* (2013.01); *C08L 2207/04* (2013.01)

(58) Field of Classification Search
CPC ........ C08L 67/025; C08L 67/02; C08G 63/66; C08G 63/68; C08G 63/672; C08G 63/676; B60C 7/00; B60C 7/08; B60C 7/10–22; B60C 2007/055
See application file for complete search history.

(56) References Cited

U.S. PATENT DOCUMENTS

| | | |
|---|---|---|
| 3,723,568 A | 3/1973 | Hoeschele |
| 5,371,143 A | 12/1994 | Novak et al. |
| 2003/0137078 A1* | 7/2003 | Saito ................. F16J 3/041 264/211 |
| 2005/0038189 A1* | 2/2005 | Takimoto ............ C08L 23/04 264/141 |
| 2006/0142442 A1 | 6/2006 | Scherzer et al. |
| 2008/0081873 A1 | 4/2008 | Kanae et al. |
| 2008/0185558 A1 | 8/2008 | Hein et al. |
| 2016/0130440 A1 | 5/2016 | Furukawa et al. |
| 2018/0002524 A1 | 1/2018 | El-Hibri et al. |
| 2019/0329590 A1 | 10/2019 | Araujo da Silva et al. |
| 2020/0114686 A1 | 4/2020 | Nakakita et al. |
| 2020/0262241 A1 | 8/2020 | Eguchi |
| 2021/0039438 A1 | 2/2021 | Kim et al. |
| 2021/0362548 A1 | 11/2021 | Oddon et al. |
| 2022/0243052 A1 | 8/2022 | Griebel et al. |
| 2022/0243054 A1 | 8/2022 | Griebel et al. |

FOREIGN PATENT DOCUMENTS

| | | |
|---|---|---|
| CN | 102850729 A | 1/2013 |
| CN | 109963725 A | 7/2019 |
| EP | 0133357 A2 | 2/1985 |
| JP | S60-53562 A | 3/1985 |
| JP | H02-16158 A | 1/1990 |
| JP | H06-207086 A | 7/1994 |
| JP | 2001-240663 A | 9/2001 |
| JP | 2001-247752 A | 9/2001 |
| JP | 2003-012906 A | 1/2003 |
| JP | 2012-140532 A | 12/2012 |

(Continued)

OTHER PUBLICATIONS

Partial machine translation of WO 2013137370 (Year: 2013).*
Partial machine translation of WO 2018079161 (Year: 2018).*
Extended European Search Report and Opinion in application EP 20847972.5, mailed Jul. 31, 2023.
International Preliminary Report on Patentability and Written Opinion, in application PCT/US2020/033385, mailed Feb. 1, 2022.
International Search Report, in application PCT/US2020/033385, dated Aug. 27, 2020.
Wei, Huang, "Pavement Design Theory and Method for Long-Span Bridge," China Architecture & Building Press, Chapter 3 excerpt, pp. 70-72, copyright 2006.

(Continued)

*Primary Examiner* — Kregg T Brooks
(74) *Attorney, Agent, or Firm* — Shaun J. Fox; Jenny L. Sheaffer

(57) ABSTRACT

Disclosed herein are polymeric blends suitable for use in non-pneumatic tires, processes for preparing the polymeric blends, and non-pneumatic tires and components thereof incorporating the polymeric blend. The polymeric blends include a thermoplastic polyester elastomer and a crosslinking compound.

20 Claims, No Drawings

(56) References Cited

FOREIGN PATENT DOCUMENTS

| | | | | | |
|---|---|---|---|---|---|
| JP | 2013-221037 | A | 10/2013 | | |
| JP | 2015-005344 | A | 1/2015 | | |
| JP | 2019-001362 | A | 1/2019 | | |
| WO | 2005-116128 | A1 | 12/2005 | | |
| WO | 2006-119059 | A1 | 11/2006 | | |
| WO | 2007-022990 | A1 | 3/2007 | | |
| WO | 2011-106760 | A2 | 9/2011 | | |
| WO | WO-2013137370 | A1 | * | 9/2013 | ............ B32B 15/08 |
| WO | 2013-171280 | A1 | 11/2013 | | |
| WO | 2015-160592 | A1 | 11/2015 | | |
| WO | WO-2018079161 | A1 | * | 5/2018 | ............ B32B 25/14 |
| WO | 2018-234693 | A1 | 12/2018 | | |
| WO | 2019-093212 | A1 | 5/2019 | | |
| WO | 2019-093747 | A1 | 5/2019 | | |

OTHER PUBLICATIONS

Hytrel 5555HS-TPC Campus Datasheet, by Celanese, dated May 16, 2023.
Hytrel 30HS Production Information, by DuPont, dated Sep. 20, 2016.
Third party submission in application JP2022-502465, submitted Nov. 7, 2020.
XP002809782 document from EPO, relating to JPH06-207086A, (1994).
XP002809783 document from EPO, relating to CN102805729A, (2013).
Zhao, et al., "Advance of Non-Pneumatic Wheels and Mechanical Characteristics," Journal of Jiangsu University (Natural Science Edition), vol. 37, issue 6, 2016, pp. 621-627.
Arnitel TPE Brochure, by DSM Engineering Plastics, downloaded Jul. 17, 2019.
Design Guide for Hytrel, by DuPont, undated, downloaded Jul. 17, 2019.
Pawlak, et al., "Characterization of Scrap Poly(ethylene)terephthalate," European Polymer Journal, 36 (2008), pp. 1875-1884.
Hytrel Product Reference Guide, by DuPont, undated, downloaded Feb. 28, 2019.
InChem Phenoxy Resin Brochure, by InChem Corp., undated, downloaded Mar. 15, 2019.
Kopel KP3340 Product Information, by Kolon Plastics, Inc., undated, downloaded Apr. 19, 2023.
LNP Lubricomp Brochure, by Sabic, copyright 2016.
Luvocom Brochure, by Lehmann & Voss & Co., undated, downloaded Jul. 17, 2019.
Mascia, et al., "Blends of Aromatic Polysulphones and Alkane Terephthalate Polymers: Compatibilization With Polyhydroxyether of Bisphenol-A," High Perform. Polymer., vol. 8 (1996), pp. 119-131.
Materials Data Book, by Cambridge Univ. Eng. Dept., 2003 edition.
Pelprene Brochure, by Toyobo USA Inc., copyright 2019, downloaded Jul. 17, 2019.
Riteflex Technical Manual, by Celanese, copyright 2013.
RTP 1400 Polyethersulfone Product Data Sheet, by RTP Company, dated Jul. 24, 2009.
ThreeBond Technical News, by Three Bond Co. Ltd., Dec. 20, 1990.
Ultrason Brochure, by BASF, undated, downloaded Jul. 17, 2019.
Veradel Pesu Brochure, by Solvay, copyright 2019, downloaded Feb. 28, 2019.
Veradel A-301 NT Brochure, by Solvay, copyright 2019, downloaded Mar. 28, 2019.
Veradel Pesu Tech. Data Sheets, by Solvay, copyright 2019, downloaded Feb. 28, 2019.
Extended European Search Report and Opinion in application EP 20847450.2, mailed Aug. 2, 2023.
International Preliminary Report on Patentability and Written Opinion, in application PCT/US2020033386, mailed Feb. 1, 2022.
International Search Report, in application PCT/US2020033386, dated Sep. 3, 2020.
Polyethersulfone (PES)—Complete Guide, by Omnexus by Special Chem, copyright 2019, downloaded Feb. 28, 2019.
Veradel A-301 Brochure, by Solvay, copyright 2019, downloaded Mar. 28, 2019.

* cited by examiner

TEMPERATURE STABLE POLYMERIC BLENDS FOR USE IN NON-PNEUMATIC TIRES

This application is a national stage application of PCT/US2020/033386 filed on May 18, 2020, which claims the benefit of U.S. Provisional Application Ser. No. 62/879,600 filed on Jul. 29, 2019, all of which are incorporated herein by reference in their entirety.

FIELD

The present application is directed to polymeric blends suitable for use in non-pneumatic tires, processes for preparing the polymeric blends, and non-pneumatic tires and components thereof incorporating the polymeric blend.

BACKGROUND

While conventional (pneumatic) tires are inflated with air, non-pneumatic tires can be considered airless in that they do not rely upon air inflation to support vehicle weight or to absorb shock from a road surface. A non-pneumatic tire offers advantages with respect to lower maintenance and lack of puncture risk. Various designs have been proposed for non-pneumatic tires certain of which make use of a network of spokes connected (directly or indirectly) to an inner rim-like structure and covered by outer band or ring and a relatively thin layer of rubber. In such a design, the spokes function to provide support for the vehicle weight and their construction and composition is of critical importance in the design of the overall non-pneumatic tire.

SUMMARY

Disclosed herein are polymeric blends suitable for use in non-pneumatic tires, processes for preparing the polymeric blends, and non-pneumatic tires and components thereof incorporating the polymeric blend.

In a first embodiment, a temperature stable polymeric blend is provided. According to the first embodiment, the polymeric blend comprises: (a) a thermoplastic polyester elastomer, preferably a polyether-polyester block copolymer, having at least one of: (i) a Tg of about 50 to about 100° C., preferably about 50 to about 80° C., or (ii) a melt temperature of about 200 to about 290, preferably about 210 to about 250° C., and (b) a crosslinking compound, preferably either (i) a siloxane compound containing at least one unsaturated carbon-carbon bond or at least one sulfur atom, or (ii) an epoxide compound, wherein the total amount of (a) and (b) is 100 parts and (b) is present in an amount of about 0.5 to about 15 parts, preferably about 1 to about 10 parts, and (a) is present in an amount of about 85 to about 99.5 parts, preferably about 90 to about 99 parts.

In a second embodiment, a process for preparing a temperature stable polymeric blend is provided. According to the second embodiment, the process comprises heat blending (a) a thermoplastic polyester elastomer (preferably a polyether-polyester block copolymer) and (b) a crosslinking compound (preferably either (i) a siloxane compound containing at least one unsaturated carbon-carbon bond or at least one sulfur atom, or (ii) an epoxide compound) at a temperature of about 200 to about 280° C., preferably about 220 to about 260° C., to produce a blend, wherein the blending occurs in an extruder, preferably a twin-screw extruder, wherein the total amount of (a) and (b) is 100 parts and (b) is present in an amount of about 0.5 to about 15 parts, preferably about 1 to about 10 parts, (a) is present in an amount of about 85 to about 99.5 parts, preferably about 90 to about 99 parts, wherein the thermoplastic polyester elastomer has at least one of: (i) a Tg of about 50 to about 100° C., preferably about 50 to about 80° C., or (ii) a melt temperature of about 200 to about 290, preferably about 210 to about 250° C.

In a third embodiment, a non-pneumatic tire having a component made from the temperature stable polymeric blend of the first embodiment is disclosed.

In a fourth embodiment, a non-pneumatic tire spoke made by an injection molding process (according to an embodiment of the process of the second embodiment) and a non-pneumatic tire comprising one or more such spokes is disclosed.

DETAILED DESCRIPTION

Disclosed herein are polymeric blends suitable for use in non-pneumatic tires, processes for preparing the polymeric blends, and non-pneumatic tires and components thereof incorporating the polymeric blend.

In a first embodiment, a temperature stable polymeric blend is provided. According to the first embodiment, the polymeric blend comprises: (a) a thermoplastic polyester elastomer, preferably a polyether-polyester block copolymer, having at least one of: (i) a Tg of about 50 to about 100° C., preferably about 50 to about 80° C., or (ii) a melt temperature of about 200 to about 290, preferably about 210 to about 250° C., and (b) a crosslinking compound, preferably either (i) a siloxane compound containing at least one unsaturated carbon-carbon bond or at least one sulfur atom, or (ii) an epoxide compound, wherein the total amount of (a) and (b) is 100 parts and (b) is present in an amount of about 0.5 to about 15 parts, preferably about 1 to about 10 parts, and (a) is present in an amount of about 85 to about 99.5 parts, preferably about 90 to about 99 parts.

In a second embodiment, a process for preparing a temperature stable polymeric blend is provided. According to the second embodiment, the process comprises heat blending (a) a thermoplastic polyester elastomer (preferably a polyether-polyester block copolymer) and (b) a crosslinking compound (preferably either (i) a siloxane compound containing at least one unsaturated carbon-carbon bond or at least one sulfur atom, or (ii) an epoxide compound) at a temperature of about 200 to about 280° C., preferably about 220 to about 260° C., to produce a blend, wherein the blending occurs in an extruder, preferably a twin-screw extruder, wherein the total amount of (a) and (b) is 100 parts and (b) is present in an amount of about 0.5 to about 15 parts, preferably about 1 to about 10 parts, (a) is present in an amount of about 85 to about 99.5 parts, preferably about 90 to about 99 parts, wherein the thermoplastic polyester elastomer has at least one of: (i) a Tg of about 50 to about 100° C., preferably about 50 to about 80° C., or (ii) a melt temperature of about 200 to about 290, preferably about 210 to about 250° C.

In a third embodiment, a non-pneumatic tire having a component made from the temperature stable polymeric blend of the first embodiment is disclosed.

In a fourth embodiment, a non-pneumatic tire spoke made by an injection molding process (according to an embodiment of the process of the second embodiment) and a non-pneumatic tire comprising one or more such spokes is disclosed.

Temperature Stable Polymeric Blend

As mentioned above, the first embodiment disclosed herein is directed to a temperature stable polymeric blend. As discussed in more detail below, the temperature stable aspect of the polymeric blend refers to the ability of the blend to maintain its strength over a broad range of temperatures, such as may be encountered by a non-pneumatic tire during operation of a commercial vehicle (e.g., a tractor-trailer or bus). As used herein with respect to all of the embodiments, the phrase "temperature stable" refers to the ability of the blend to maintain at least 90% of its Modulus (e.g., 90%, 91%, 92%, 93%, 94%, 95% or more) over a temperature range of −40 to 190° C., with the Modulus referring to the MPa measurement at at least one of 50% Modulus or 100% Modulus, preferably both. In addition to maintaining its strength over a broad range of temperatures, the polymeric blend also preferably has a modulus of elasticity within a specified range and is processable via injection molding, both as discussed in more detail below.

Generally, the temperature stable polymeric blend comprises (a) a thermoplastic polyester elastomer, (b) a cross-linking compound, each as discussed in more detail below. According to the first-fourth embodiments, the amount of (a) and (b) used to prepare the temperature stable polymeric blend may vary. Generally, according to the first-fourth embodiments, when the total amount of (a) and (b) is considered to be 100 parts, (a) is present in an amount of about 85 to about 99.5 parts or 85-99.5 parts, preferably about 90 to about 99 parts or 90-99 parts and (b) is present in an amount of about 0.5 to about 15 parts or 0.5-15 parts, preferably about 1 to about 10 parts or 1-10 parts. In preferred embodiments of the first-fourth embodiments, the temperature stable polymeric blend contains no more than 5% by weight (e.g., 5%, 4%, 3%, 2%, 1%, 0.5%, or less by weight), based upon the total weight of (a) and (b) of a high temperature thermoplastic polymer having a Tg of 200° C. or higher and/or a melt temperature of 300° C. or higher is used in the blend, preferably 0% by weight of such a high temperature thermoplastic polymer. As a non-limiting example, the use of 10 parts of a high temperature thermoplastic polymer in combination with 95 parts of (a) and 5 parts of (b) would constitute 10% by weight based upon the total weight of (a) and (b) and would be more than 5% by weight.

In certain embodiments of the first-fourth embodiments, the temperature stable polymeric blend and/or a non-pneumatic tire spoke made therefrom and/or a non-pneumatic tire containing such a spoke contains no polyurethane polymer. In other words, in such embodiments, less than 1 weight % of polyurethane polymer (e.g., 0.9 weight %, 0.8 weight %, 0.7 weight %, 0.6 weight %, 0.5 weight %, 0.4 weight %, 0.3 weight %, 0.2 weight %, 0.1 weight % or less), more preferably 0 weight % of polyurethane polymer is present in the temperature table polymeric blend, non-pneumatic tire spoke made therefrom, and/or non-pneumatic tire containing such a spoke.

In other embodiments of the first-fourth embodiments, at least a portion of the thermoplastic polyester elastomer is replaced by a thermoplastic polyurethane having a Tg that is similar to the thermoplastic polyester elastomer discussed herein and/or a melt temperature that is similar to the thermoplastic polyester elastomer discussed herein.

Disclosed herein as sub-embodiments of the first embodiment, are a pelletized version of the temperature stable polymeric blend, rods or strands of the temperature stable polymeric blend, non-pneumatic tire components made from the temperature stable polymeric blend (e.g., spokes), and a non-pneumatic tire having at least one component made from the temperature stable polymeric blend, preferably one or more spokes connecting an inner rim and an outer band or ring of the tire.

Thermoplastic Polyester Elastomer

As discussed above, the temperature stable polymer blend of the first-fourth embodiments includes a thermoplastic polyester elastomer (component (a)). A thermoplastic polyester elastomer is generally understood as being a copolymer which includes both thermoplastic and elastomeric blocks, providing the copolymer with performance benefits of elastomers (e.g., flexibility at low temperatures) and of thermoplastics (e.g., retention of strength at high temperature). Suitable thermoplastic polyester elastomers for use in the blend according to the first-fourth embodiments will meet at least one of the following (i) a Tg of about 50 to about 100° C. or 50 to 100° C. (e.g., 50, 55, 60, 65, 70, 75, 80, 85, 90, 95 or 100° C.), preferably about 50 to about 80° C. or 50 to 80° C. (e.g., 50, 52, 54, 55, 56, 58, 60, 62, 64, 65, 66, 68, 70, 72, 74, 75, 76, 78, or 80° C.), and (ii) a melt temperature of about 200 to about 280° C. or 200 to 280° C. (e.g., 200, 205, 210, 215, 220, 225, 230, 235, 240, 245, 250, 255, 260, 265, 270, 275, or 280° C.), preferably about 210 to about 260° C. or 210 to 260° C. (e.g., 210, 215, 220, 225, 230, 235, 240, 245, 250, 255, or 260° C.). In preferred embodiments of the first-fourth embodiments, the thermoplastic polyester elastomer has both a Tg and a melt temperature within one of the ranges or amounts discussed above. In particularly preferred embodiments of the first-fourth embodiments, the thermoplastic polyester elastomer has both a Tg and a melt temperature within the preferred ranges or amounts discussed above. Both the Tg and the melt temperature can be determined according to standard methods such as ISO 11357. Notably, the thermoplastic polyester elastomer material will generally have two Tgs and the foregoing Tg values should be understood as referring to the higher Tg from the curve.

Various thermoplastic polyester elastomers having the foregoing described properties may be used in preparing the temperature stable polymeric blend. One or more than one thermoplastic polyester elastomer may be utilized. In preferred embodiments, the thermoplastic polyester elastomer is a polyether-polyester block copolymer and in certain such embodiments, at least 90% by weight (e.g., 90%, 91%, 92%, 93%, 94%, 95%, 96%, 97%, 98%, 99%, or 100% by weight), at least 95% by weight (e.g., 95%, 96%, 97%, 98%, 99%, or 100% by weight), at least 98% by weight (e.g., 98%, 98.5%, 99%, 99.5%, or 100% by weight), at least 99% by weight or even 100% by weight of the thermoplastic polyester elastomer comprises a polyether-polyester block copolymer. A polyether-polyester block copolymer includes a "hard" portion in the form of polyester blocks (or polyester segments) that can be produced by the reaction of a dicarboxylic derivative (e.g., terephthalate or naphthalate) and one or more diols (e.g., butanediol, propanediol) and also includes a "soft" or elastomeric portion in the form of polyether blocks (or polyether segments) that can be based upon polyalkylene ether glycols). The relative amount of polyester blocks and polyether blocks can vary with the weight % of total units from the polyester blocks being 30 to 90% by weight (e.g., 30, 35, 40, 45, 50, 55, 60, 65, 70, 75, 80, 85, or 90% by weight) of the overall copolymer, preferably 30 to 40% by weight (e.g., 30, 32, 34, 35, 36, 38, or 40% by weight) of the overall copolymer and the weight % of total units from the polyether blocks being 10 to 70% by weight (e.g., 10, 20, 30, 40, 50, 60, or 70 weight %) of the overall copolymer, preferably 60 to 70% by weight (e.g., 60, 62, 64, 65, 66, 68, or 70 weight %) of the overall copolymer. Exemplary polyether-polyester block copolymers which are suitable for use include polyalkylene-terephthalate-polyalkylene ether glycol copolymers and polyalkylene-naphthalate-polyalkylene ether glycol copolymers, with polyalkylene terephthalate-polyalkylene ether glycol copolymers such as polybutylene terephthalate-polymethylene ether glycol being preferred. The polyalkylene ether glycol portion of the polyether-polyester block copolymer can be selected from the group consisting of polypropylene ether glycol, polytetramethylene ether glycol, polytrimethylene ether glycol, polymethylene ether glycol, and combinations thereof.

Various polyether-polyester block copolymers are commercially available and may be suitable for use as the thermoplastic polyester elastomer (a) in the polymeric blend, including, but not limited to various grades of Hytrel® (available from DuPont™), Riteflex® (available from Celanese Corporation), Arnitel® (available from DSM Engineering Plastics), Pelprene® (available from Toyobo U.S.A., Inc.). Suitable grades of the foregoing thermoplastic polyester elastomers can be selected using the other properties described herein (e.g., Tg and melt temperature). For example, under the Pelprene® brand from Toyobo, ultra heat-resistant S types or P-type with high flexibility and high melting point may be useful.

In certain embodiments of the first-fourth embodiments, the thermoplastic polyester elastomer has at least one of the following properties: (a) a Shore D hardness (as measured by ISO 868, 15 seconds) of 20-70 (e.g., 20, 25, 30, 35, 40, 45, 50, 55, 60, 65, or 70) or 30-60 (e.g., 30, 35, 40, 45, 50, 55, or 60), (b) a tear strength (as measured by ISO 150-34-1) of 70-130 kN/m (e.g., 70, 75, 80, 85, 90, 95, 100, 105, 110, 115, 120, 125, or 130 kN/m) or 75-125 kN/m (e.g., 75, 80, 85, 90, 95, 100, 105, 110, 115, 120, or 125 kN/m) in the parallel and/or 60-130 kN/m (e.g., 60, 65, 70, 75, 80, 85, 90, 95, 100, 105, 110, 115, 120, 125, or 130 kN/m) or 70-125 kN/m (e.g., 70, 75, 80, 85, 90, 95, 100, 105, 110, 115, 120, or 125 kN/m) in the normal, (c) a notched impact strength (as measured by ISO 179/1eA) at 23° C. of at least 40 kJ/m$^2$, including 40-100 kJ/m$^2$ (e.g., 40, 45, 50, 55, 60, 65, 70, 75, 80, 85, 90, 95 or 100 kJ/m$^2$) and 50-90 kJ/m$^2$ (50, 55, 60, 65, 70, 75, 80, 85, or 90 kJ/m$^2$), (d) a flexural modulus (as measured by ISO 178) of 20-100 MPa (e.g., 20, 25, 30, 35, 40, 45, 50, 55, 60, 65, 70, 75, 80, 85, 90, 95 or 100 MPa) or 20-90 MPa (e.g., 20, 25, 30, 35, 40, 45, 50, 55, 60, 65, 70, 75, 80, 85, or 90 MPa), (e) a stress at break (as measured by ISO 527) of 20-40 MPa (e.g., 20, 25, 30, 35, or 40 MPa) or 22-38 MPa (e.g., 22, 24, 26, 28, 30, 32, 34, 36, or 38 MPa) or 24-36 MPa (e.g., 24, 26, 28, 30, 32, 34, or 36 MPa), or (f) a nominal strain at break (as measured by ISO 527) of at least 600% or 600-1000% (e.g., 600, 650, 700, 750, 800, 850, 900, 950, or 1000%) or 650-950% (e.g., 650, 700, 750, 800, 850, 900, or 950%) or 700-900% (e.g., 700, 750, 800, 850, or 900%). In certain embodiments of the first-fourth embodiments, each of the foregoing (a)-(c) are met. In certain embodiments of the first-fourth embodiments, each of the foregoing (a)-(c) are met and at least one of (d)-(f) are also met. In yet other embodiments of the first-fourth embodiments, each of (a)-(f) are met.

Crosslinking Compound

As discussed above, the temperature stable polymeric blend of the first-fourth embodiments includes a crosslinking compound (component (b)). According to the first-fourth embodiments, the particular crosslinking compound that is utilized may vary. In preferred embodiments of the of the first-fourth embodiments, the crosslinking compound is either (i) a siloxane compound containing at least one unsaturated carbon-carbon bond or at least one sulfur atom, or (ii) an epoxide compound. In certain preferred embodiments of the first-fourth embodiments, the crosslinking compound consists of a siloxane compound containing at least one unsaturated carbon-carbon bond or at least one sulfur atom. In other preferred embodiments of the first-fourth embodiments, the crosslinking compound consists of an epoxide compound.

According to the first-fourth embodiments, when the crosslinking compound comprises (or consists of) a siloxane compound containing at least one unsaturated carbon-carbon bond or at least one sulfur atom, various compounds may be utilized. Exemplary siloxane compounds containing at least one unsaturated carbon-carbon bond include compounds having the formula $R^1Si(R^2)_{3-n}$, where $R^1$ is a hydrocarbyl group having 2-20 carbon atoms (e.g., 2, 3, 4, 5, 6, 7, 8, 9, 10, 11, 12, 13, 14, 15, 16, 17, 18, 19, or 20), preferably 2-10 carbon atoms (e.g., 2, 3, 4, 5, 6, 7, 8, 9, or 10), and at least one unsaturated carbon-carbon bond is present within $R^1$, n is an integer selected from 0, 1, or 2, and each $R^2$ is independently selected from halogen (e.g., chlorine, bromine, iodine, or fluorine), alkoxy of $C_1$-$C_{20}$ (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, or $C_{20}$), preferably alkoxy of $C_1$-$C_{10}$ (e.g., $C_1$, $C_2$, $C_3$, $C_4$, $C_5$, $C_6$, $C_7$, $C_8$, $C_9$, or $C_{10}$), more preferably alkoxy of $C_1$-$C_6$ (e.g., $C_1$, $C_2$, $C_3$, $C_4$, $C_5$, or $C_6$), most preferably alkoxy of $C_1$ or $C_2$. In certain embodiments of the first-fourth embodiments $R^1$ is a vinyl group, an allyl group, or another univalent unsaturated (i.e., containing at least one carbon-carbon double bond or at least one carbon-carbon triple bond) hydrocarbyl group having 2-20 carbon atoms (e.g., 2, 3, 4, 5, 6, 7, 8, 9, 10, 11, 12, 13, 14, 15, 16, 17, 18, 19, or 20), preferably 2-10 carbon atoms (e.g., 2, 3, 4, 5, 6, 7, 8, 9, or 10). Suitable $R^1$ groups can also be described as including moieties that allow the siloxane compound to function as a Michael acceptor.

According to the first-fourth embodiments, when the crosslinking compound comprises (or consists of) a siloxane compound having at least one sulfur atom (e.g., one, two, or four sulfur atoms), various compounds may be utilized. In certain embodiments of the first-fourth embodiments, the siloxane compound having at least one sulfur atom comprises at least one of a monosulfide-based alkoxy-containing, a disulfide-based alkoxy-containing, or a tetrasulfide-based alkoxy-containing compound. Disulfide-based alkoxy-containing and tetrasulfide-based alkoxy-containing compounds include bis(trialkoxysilylorgano)polysulfides such as the bis(trialkoxysilylorgano) disulfides and the bis(trialkoxysilylorgano)tetrasulfides. Specific non-limiting examples of bis(trialkoxysilylorgano)disulfides include, but are not limited to, 3,3'-bis(triethoxysilylpropyl) disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano)tetrasulfide compounds include, but are not limited to, bis(3-triethoxysilylpropyl)tetrasulfide, bis(2-triethoxysilylethyl) tetrasufide, bis(3-trimethoxysilylpropyl) tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof.

In certain embodiments of the first-fourth embodiments, when the crosslinking compound comprises (or consists of) a siloxane compound having at least one sulfur atom, a mercaptosilane compound, a blocked mercaptosilane compound, or a combination thereof is utilized. Mercaptosilane compounds suitable for use as a crosslinking compound according to the first-fourth embodiments described herein include those with the general formula HS—$R^3$—Si($X_m$)($R^4_{3-m}$) where each X is independently selected from a halogen or an alkoxy group (if an alkoxy group, of the formula $OR^5$ where $R^5$ is a $C_1$ to $C_6$ (e.g., $C_1$, $C_2$, $C_3$, $C_4$, $C_5$, or $C_6$) aliphatic, cycloaliphatic or aromatic group; $R^3$ is selected from a $C_1$ to $C_4$ alkylene (e.g., $C_1$, $C_2$, $C_3$, or $C_4$); each $R^4$ is independently selected from a $C_1$ to $C_{30}$ alkyl (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, or $C_{30}$), $C_7$ to $C_{30}$ alkaryl (e.g., $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, or $C_{30}$), $C_5$ to $C_{30}$ (e.g., $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, or $C_{30}$), $C_5$ to $C_{30}$ cycloaliphatic (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, or $C_{30}$), or $C_6$ to $C_{20}$ aromatic (e.g., $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, or $C_{20}$); and m is an integer from 1 to 4 (e.g., 1, 2, 3, or 4). When X is a halogen, it can be selected from the group consisting of chlorine, bromine, iodine and fluorine, preferably chlorine. In certain embodiments of the first-fourth embodiments disclosed herein, the bi-functional silane coupling agent has the above formula and $R^3$ is selected from a $C_1$ to $C_3$ alkylene (e.g., $C_1$, $C_2$, or $C_3$), X is an alkoxy group (with carbon portion of $C_1$ to $C_6$, e.g., $C_1$, $C_2$, $C_3$, $C_4$, $C_5$, or $C_6$), and n is 3. In certain embodiments of the first-fourth embodiments disclosed herein, mixtures of various (i.e., more than one) mercaptosilane compound can be used. Preferred mercaptosilanes include those selected from the group consisting of 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltriproxysilane, 18-mercaptooctadecyldiethoxychlorosilane, and combinations thereof. Blocked mercaptosilanes suitable for use as the crosslinking compound according to the first-fourth embodiments described herein include those with the general formula B—S—$R^6$—Si—$X_3$ with a blocking group B that replaces the mercapto hydrogen atom to "block" the reaction of the sulfur atom with the polymer. In certain embodiments of the first-fourth embodiments disclosed herein where the bi-functional silane coupling agent is a blocked mercaptosilane with the foregoing general formula, B is a blocking group which can be in the form of an unsaturated heteroatom or carbon bound directly to sulfur via a single bond; $R^6$ is selected from a $C_1$ to $C_6$ linear or branched alkyl chain (i.e., $C_1$, $C_2$, $C_3$, $C_4$, $C_5$, or $C_6$), and each X is independently selected from the group consisting of $C_1$ to $C_6$ alkyl (i.e., $C_1$, $C_2$, $C_3$, $C_4$, $C_5$, or $C_6$), $C_1$ to $C_6$ alkoxy (i.e., $C_1$, $C_2$, $C_3$, $C_4$, $C_5$, or $C_6$), halogen (e.g., chlorine, bromine, iodine, or fluorine), halogen-containing $C_1$ to $C_6$ alkyl (i.e., $C_1$, $C_2$, $C_3$, $C_4$, $C_5$, or $C_6$), and halogen-containing $C_1$ to $C_6$ alkoxy (i.e., $C_1$, $C_2$, $C_3$, $C_4$, $C_5$, or $C_6$). Suitable blocked mercapto silanes for use as the crosslinking compound according to the first-fourth embodiments disclosed herein, include, but are not limited to, those described in U.S. Pat. Nos. 6,127,468; 6,204,339; 6,528, 673; 6,635,700; 6,649,684; 6,683,135; and 7,256,231. Particular blocked mercapto silane compounds include those selected from the group consisting of 2-triethoxysilyl-1-ethylthioacetate; 2-trimethoxysilyl-1-ethylthioacetate; 2-(methyldimethoxy-silyl)-1-ethylthioacetate; 3-trimethoxysilyl-1-propylthioacetate; triethoxysilyl methyl-thioacetate; trimethoxysilylmethylthioacetate; triisopropoxysilyl-methylthioacetate; methyldiethoxysilylmethylthioacetate; methyldimethoxysilylmethylthioacetate; methyldiisopropoxysilylmethylthioacetate; dimethylethoxysilylmethyl-thioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethyl-thioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propylthioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetyl-norbornene; 2-(2-triethoxy-silyl-1-ethyl)-4-thioacetyln-orbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthio-acetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethyl-thioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyllpropyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyl-dimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propyl-ethanethiosulfonate; 3-triethoxysilyl-1-propylbenzenethio-sulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and combinations thereof.

In certain embodiments of the first-fourth embodiments, when the crosslinking compound comprises (or consists of) a siloxane compound, a polysiloxane compound is used. Generally, a polysiloxane compound can be understood as a compound containing multiple siloxane moieties or —[Si—O]$_x$—. Thus, by referring to polysiloxane moieties is meant that x is an integer of at least 2. In certain embodiments of the first-fourth embodiments, x is an integer of 2 to 50 (e.g., 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50), preferably an integer of 2 to 20 (e.g., 2, 3, 4, 5, 6, 7, 8, 9, 10, 11, 12, 13, 14, 15, 16, 17, 18, 19, or 20) or 4 to 8 (e.g., 4, 5, 6, 7, or 8). Suitable polysiloxane compounds include both linear and cyclic (including cage) structures.

According to the first-fourth embodiments, when the crosslinking compound comprises (or consists of) an epoxide compound, various compounds may be utilized. Non-limiting examples of suitable epoxide compounds include epoxidized plant oils and poly-epoxide compounds. More specifically, suitable epoxidized plant oils include, but are not limited to epoxidized soybean oil, epoxidized linseed oil, epoxidized sunflower oil, epoxidized safflower oil, epoxidized olive oil, epoxidized canola oil, epoxidized corn oil, epoxidized flaxseed oil, epoxidized castor oil, epoxidized sesame oil, epoxidized cashew nut oil, epoxidized macadamia nut oil, epoxidized cottonseed oil, epoxidized jojoba oil, epoxidized palm oil, epoxidized coconut oil, epoxidized palm oil, epoxidized tung oil, epoxidized, epoxidized peanut oil. Alternatively, an epoxidized form of an animal sourced oil such as lard could be utilized. Preferably, when the epoxide compound is an epoxidized plant oil, epoxidized soybean oil or epoxidized linseed oil are used, each of which are generally available from various suppliers.

Generally, a poly-epoxide compound can be understood as including co- and ter-polymers which incorporate more than one epoxy functionality. A poly-epoxide compound which includes more than one epoxy functionality can also be described as including multiple mers of epoxy-containing monomers. More specifically, suitable poly-epoxide copolymers include an epoxy monomer such as glycidyl or phenyl glycidyl and a second monomer such as an isocyanate or an aldehyde. Suitable poly-epoxide terpolymers include an epoxy monomer such as glycidyl or phenyl glycidyl and a second and third monomer such as an isocyanate, aldehyde, aromatic amine, (meth)acrylate, or cresol. Non-limiting examples of suitable poly-epoxide compounds suitable for use as the delayed crosslinking agent include poly(ethylene-co-methyl acrylate-co-glycidyl methacrylate), poly(ethylene-co-glycidyl methacrylate), poly[(o-cresyl glycidyl ether)-co-formaldehyde), poly[(phenyl glycidyl ether)-co-formaldehyde), N,N-diglycidyl-4-glycidyloxyaniline, triglycidyl isocyanurate, and combinations thereof.

In certain embodiments of the first-fourth embodiments, when the delayed crosslinking agent is a poly-epoxide compound it is selected from one or more types of epoxy resins, more specifically from the group consisting of glycidyl epoxy resins, non-glycidyl epoxy resins, and combinations thereof. In certain embodiments of the first-fourth embodiments, the delayed crosslinking agent comprises a glycidyl epoxy resin; in certain such embodiments, the delayed crosslinking agent consists of a glycidyl epoxy resin. In certain embodiments of the first-fourth embodiments, the delayed crosslinking agent comprises a non-glycidyl epoxy resin; in certain such embodiments, the delayed crosslinking agent consists of a non-glycidyl epoxy resin. Exemplary types of glycidyl epoxy resins include glycidoxy-ethers (e.g., glycidyl ether of bisphenol A and novolac epoxy resins), glycidoxy-esters, and glycidoxy-amines. In certain embodiments of the first-fourth embodiments, the delayed crosslinking agent comprises a glycidoxy-ether resin; in certain such embodiments, the delayed crosslinking agent consists of a glycidoxy-ether resin. Exemplary types of non-glycidyl epoxy resins include aliphatic epoxy resins and cycloaliphatic resins. Without being bound by theory it is believed that the siloxane crosslinking compound reacts with the thermoplastic polyester elastomer via unsaturation that exists in the elastomer chain. As a non-limiting example, the unsaturated carbon-carbon bond in the siloxane compound or the sulfur atom(s) in the siloxane compound can allow the siloxane compound to add across the unsaturated portion of the elastomer chain of the thermoplastic polyester elastomer. Such addition may take place in the presence of a radical generator or radical initiator (as discussed in more detail below), and may preferably be at least partially delayed until injection molding of a shape from the temperature stable polymeric blend. Additionally, when the crosslinking agent comprises a siloxane compound, a catalyst may optionally be used to aid in formation of a crosslinked network via the siloxane compounds that have been added to the thermoplastic polyester elastomer. Alternatively, when the crosslinking compound comprises an epoxide compound, the epoxy group or groups react with the carboxylic acid end of the thermoplastic polyester elastomer to produce a functionalized elastomer which allows for curing (via crosslinking) during or after molding of a shape (preferably after molding of the shape) from the temperature stable polymeric blend. As described in more detail below, when the crosslinking compound comprises an epoxide compound, a catalyst may optionally be used in aid in formation of a crosslinked or cured form of the temperature stable polymeric blend.

Radical Generator

As mentioned above, in those embodiments of the first-fourth embodiments wherein the crosslinking agent comprises a siloxane compound, a radical generator is preferably used to facilitate the reaction between the siloxane compound and the unsaturation in the thermoplastic polyester elastomer. Thus, in such embodiments, the temperature stable polymeric blend further comprises a radical generator. Generally, the radical generator can be any compound capable of generating a free radical and thereby increasing reactivity of the siloxane compound. As a non-limiting example, a free radical could form from the unsaturated portion (e.g., vinyl) of the siloxane or on the sulfur atom when a sulfur-containing siloxane is used. According to the first-fourth embodiments various compounds may be used as a radical generator. Non-limiting examples of compounds suitable for use as a radical generator include, but are not limited to peroxide compounds, azo compounds, di- and tri-sulfide compounds, persulfate compounds, perborate compounds, and percarbonate compounds. Exemplary peroxide compounds include hydrogen peroxide as well as acyl, aroyl, alkyl, or aryl peroxides such as benzoyl peroxide, acetyl peroxide, lauroyl peroxide, tert-butyl peroxide, di-tert-butyl peroxide, benzoyl peroxide, di-benzoyl peroxide, di-iso-nonanoyl peroxide, decanoyl peroxide, succinic acid peroxide, methyl benzoyl peroxide, acetyl benzoyl peroxide, methyl cyclohexyl peroxide, di-acetyl peroxide, tert-butyl peracetate, tert-butyl peroxybenzoate, tert-butyl hydroperoxide, tert-amyl hydroperoxide, di-tert-hexyl peroxide, cumene hydroperoxide, di-cumyl hydroperoxide, tetralin hydroperoxide, phenylcyclohexane hydroperoxide, 1,1-bis (tert-amylperoxy)cyclohexane, 1,1-bis(tert-butylperoxy)cyclohexane, 1,1-bis(tert-butylperoxy)-3,3,5-trimethylcyclohexane, 2,5-bis(tert-butylperoxy)-2,5-dimethylhexane, and 2,5-di(tert-butylperoxy)-2,5-dimethyl-3-hexyne. Exemplary azo compounds include azobis-nitriles such as azobis-alkyl-nitriles (e.g., 4,4'-azobis(4-cyanovaleric acid), 1,1'-azobis (cyclohexanecarbonitrile), 2,2'-azobis(2-methylpropionitrile), 2,2'-azobis(2,4-dimethylpentanenitrile), and 2,2'-azobis(2-methylbutanenitrile)). Di- and tetrasulfide compounds can be useful in generating sulfur which can in turn generate radicals. Exemplary di- and tetrasulfide compounds include bis(trialkoxysilylorgano)polysulfides including particularly bis(trialkoxysilylorgano) disulfides and bis(trialkoxysilylorgano)tetrasulfides. Specific non-limiting examples of bis(trialkoxysilylorgano)disulfides include, but are not limited to, 3,3'-bis(triethoxysilylpropyl)disulfide, 3,3'-bis(trimethoxysilylpropyl)disulfide, 3,3'-bis (tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilyl-propyl)disulfide, 12,12'-bis(triisopropoxysilylpropyl)disulfide, 3,3'-bis(dimethoxyphenylsilyl-2-methylpropyl) disulfide, and mixtures thereof. Non-limiting examples of bis(trialkoxysilylorgano)tetrasulfides include, but are not limited to, bis(3-triethoxysilylpropyl)tetrasulfide, bis(2-triethoxysilylethyl) tetrasufide, bis(3-trimethoxysilylpropyl) tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof.

Exemplary persulfate compounds include sodium, potassium, and ammonium persulfates. Exemplary perborates include alkali metal and ammonium perborates. Exemplary percarbonates include alkyl percarbonates (e.g., tert-butyl percarbonate, iso-butyl percarbonate, iso-propyl percarbonate), alkali metal percarbonates (e.g., sodium percarbonate).

Catalysts

In certain embodiments of the first-fourth embodiments, the temperature stable polymeric blend additionally includes (i.e., further comprises) a catalyst. The use of a catalyst may be beneficial in achieving crosslinking or curing of the temperature stable polymeric blend such as when the blend is used as a component in a non-pneumatic tire. In preferred embodiments of the first-fourth embodiments, when a catalyst is utilized, it may be selected so as to allow for a delay in crosslinking (e.g., after injection molding of a shape from a pelletized form of the temperature stable polymeric blend). As those of skill in the art will appreciate, the selection of a suitable catalyst will generally be guided by the choice of crosslinking compound.

In those embodiments of the first-fourth embodiments when the crosslinking agent comprises (or consists of) a siloxane compound, the catalyst preferably is nucleophilic. In more preferred embodiments, the nucleophilic catalyst is a mild nucleophilic catalyst. Exemplary nucleophilic catalysts include, but are not limited to, quaternary ammonium salts, quaternary phosphonium salts, and hindered amines. The "salt" portion of the quaternary ammonium salt or quaternary phosphonium salt may comprise fluoride, bromide, chloride, or iodide, with iodide being preferred. More specifically, exemplary quaternary ammonium salts include cetyl tributyl ammonium fluoride, cetyl trimethyl ammonium fluoride, cetyl trimethyl ammonium bromide, tetra-butyl ammonium chloride, tetra-butyl ammonium bromide, tetra-butyl ammonium iodide, tetra-butyl ammonium fluoride, tetra-butyl ammonium perchloriate, tetra-ethyl ammonium bromide, benzyl tributyl ammonium bromide, benzyl tributyl ammonium chloride, benzyl triethyl ammonium bromide, benzyl triethyl ammonium chloride, Q benzyl trimethyl ammonium chloride, cetyl pyridinium chloride, didecyl dimethyl ammonium chloride, dodecyl trimethyl ammonium bromide, dodecyl trimethyl ammonium chloride, methyl tributyl ammonium chloride, methyl tributyl ammonium chloride, methyl tricaprylyl ammonium chloride, methyl triactyl ammonium chloride, myristyl trimethyl ammonium bromide, cetyl pyridinium bromide, phenyl trimethyl ammonium chloride, tetraethyl ammonium bromide, tetraethyl ammonium chloride, tetraethyl ammonium hydroxide, tetrahexyl ammonium bromide, tetrahexyl ammonium iodide, tetramethyl ammonium bromide, tetramethyl ammonium chloride, tetramethyl ammonium fluoride, tetramethyl ammonium hydroxide, tetramethyl ammonium iodide, tetraoctyl ammonium bromide, tetrapropyl ammonium bromide, tetrapropyl ammonium chloride, tetrapropyl ammonium hydroxide, tetraethyl ammonium chloride, tetraethyl ammonium hydroxide, tetramethyl ammonium bromide, tetramethyl ammonium chloride, tetramethyl ammonium fluoride, tetramethyl ammonium hydroxide, tetraoctyl ammonium bromide, tetrapropyl ammonium bromide, tetrapropyl ammonium chloride, tetrapropyl ammonium hydroxide, tributyl methyl ammonium chloride, and triethyl benzyl ammonium chloride. More specifically, exemplary quaternary phosphonium salts include benzyl triphenyl phosphonium bromide, benzyl triphenyl phosphonium chloride, butyl triphenyl phosphonium bromide, butyl triphenyl phosphonium chloride, ethyl triphenyl phosphonium acetate, ethyl triphenyl phosphonium bromide, ethyl triphenyl phosphonium iodide, methyl triphenyl phosphonium bromide, tetrabutyl phosphonium bromide, and tetraphenyl phosphonium bromide. Exemplary hindered amines include Cert-alkyl amines, di(tert-alkyl) amines, and tri(tert-alkyl) amines wherein the nitrogen may optionally be present in a hetrocyclic ring (e.g., pyrrolidine or piperidine). More specific examples of hindered amines are tert-butyl amine, di-tert-butyl amine, di-tert-butyl-cyclopropyl amine, iso-propyl amine, di-iso-propyl-ethyl amine, tert-pentyl amine, 2,2,4,4-tetramethyl pyrrolidines wherein the nitrogen atom is substituted with an alkyl group, and 2,2,6,6-tetramethyl piperidines wherein the nitrogen atom is substituted with an alkyl group.

In those embodiments of the first-fourth embodiments when the crosslinking agent comprises (or consists of) a siloxane compound and a nucleophilic catalyst is utilized, as discussed above, the timing for when catalyst is combined with the other ingredients of the temperature stable polymeric blend may vary. In certain embodiments of the first-fourth embodiments when the crosslinking compound is a siloxane compound, the nucleophilic catalyst is mixed with the thermoplastic polyester elastomer and the crosslinking compound when preparing the temperature stable polymeric blend. In other preferred embodiments of the first-fourth embodiments when the crosslinking compound is a siloxane compound, the nucleophilic catalyst is added after formation of the temperature stable polymeric blend, e.g., prior to injection molding of a shape from the temperature stable polymeric blend. In certain embodiments wherein the nucleophilic catalyst is added after formation of the temperature stable polymeric blend, the blend is in the form of pellets and the catalyst is added to the pellets prior to injection molding of a shape from the temperature stable polymeric blend. According to such embodiments, the catalyst may be added pre-mixed with the pellets of the blend prior to addition to an injection molding apparatus or may be added along with the pellets of the blend to a mixer or hopper which forms a part of the injection molding apparatus.

In those embodiments of the first-fourth embodiments when the crosslinking agent comprises (or consists of) an epoxy compound, the catalyst preferably is an amine compound or a carboxylic acid compound. Various types of amine compounds can be suitable for use as a catalyst with the epoxy form of the crosslinking compound including aliphatic amines, alicyclic amines, and aromatic amines, with aliphatic amines being preferred and secondary aliphatic amines being more preferred. More specifically, suitable aliphatic amines can include compounds such as ethylenediamine, hexamethylenediamine, methylpentamethylenediamine, N—N-dimethylpropylenediamine, N—N-diethylpropylenediamine, ethylenetriamine, diethylenetria mine, triethylenetetra mine, tetraethylenepenta mine, trimethylhexamethylenediamine, dipropenediamine, diethylaminopropylamine, and combinations thereof. Suitable alicyclic amines can include compounds such as N-aminoethylpiperazine, piperidine, menthane diamine, 1,2-diaminocyclohexane, 1,4-diaminocyclohexane, bis(4-aminocyclohexyl)methane, bis(3,5-methyl-4-aminocyclohexyl)methane, bis (3,5-methyl-4-aminocyclohexyl)methane; 2,4-bis(4-aminocyclohexylmethyl)cyclohexylamine; 2,2-bis(4-aminocyclohexyl)propane; 4,4'-bis(4-cyclohexylmethyl) dicyclohexylamine; 2,2-bis(4-amino-3-methylcylohexyl) propane; 3-aminomethyl-3,5,5-trimethylcyclohexylamine (isophorone diamine); 1,4-bis(aminomethyl)cyclohexane; 1,3-bis(aminomethyl)cyclohexane; bicyclo[2.2.1]heptanebis(methylamine) (norbornane diamine); 3,3,5-trimethyl-N-(propan-2-yl)-5-[(propan-2-ylamino)methyl]cyclohexylamine, isophoronediamine, and combinations thereof. Suitable aromatic amines can include compounds such as m-xylylenediamine, p-xylylenediamine, metaphenylene diamine, diaminodiphenylmethane, benzyldimethylamine, tris-2,4,6-dimethylaminomethylphenol, diaminodiphenylsulfone, and combinations thereof. Various types of carboxylic acid compounds can be suitable for use as a catalyst with the epoxy form of the crosslinking compound including carboxylic acid salts and carboxylic acid anhydrides, with carboxylic acid salts being preferred. More specifically, suitable carboxylic acid salts include those compounds wherein the "salt" is selected from a metal such as barium, cadmium, calcium, cerium, copper, iron, lanthanum, lead, manganese, zinc, zirconium, lithium, sodium, and potassium, with zinc, sodium and potassium being preferred and the carboxylic acid portion is selected from $C_1$-$C_{24}$ carboxylic acid (with the C number referring to the total number of carbon atoms in the carboxylic acid including the carbon in the COOH moiety and including $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, and $C_{20}$), with $C_1$-$C_{18}$ (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, or $C_{18}$) being preferred, and $C_{12}$-$C_{18}$ (e.g., $C_{12}$, $C_{13}$, $C_{14}$, $C_{15}$, $C_{16}$, $C_{17}$, or $C_{18}$) being more preferred. More specifically, suitable carboxylic acid anhydrides include both symmetrical and unsymmetrical carboxylic acid anhydrides including linear polymeric anhydrides (e.g., polysebacic and polyazelaic anhydride), alicyclic anhydrides (e.g., methyltetrahydrophthalic anhydride, tetrahydro phthalic anhydride, methyl nadic anhydride, hexahydro phthalic anhydride, and methylhexahydro phthalic anhydride), simple alicylic anhydrides (e.g., succinic anhydride, substituted succinic anhydride, citric add anhydride, maleic anhydride and special adducts of maleic anhydride, dodecyl succinic anhydride, maleic anhydride vinyl and styrene copolymers of maleic anhydride), Multi-ring alicyclic anhydrides and aromatic anhydrides (e.g., phthalic anhydride, trimellitic anhydride, and nadicmethyl anhydride).

In those embodiments of the first-fourth embodiments when the crosslinking agent comprises (or consists of) an epoxy compound and catalyst is utilized, as discussed above, the timing for when catalyst is combined with the other ingredients of the temperature stable polymeric blend may vary. In preferred embodiments of the first-fourth embodiments when the crosslinking compound is an epoxy compound, the catalyst is added after formation of the temperature stable polymeric blend, e.g., prior to injection molding of a shape from the temperature stable polymeric blend. In certain embodiments wherein the catalyst is added after formation of the temperature stable polymeric blend, the blend is in the form of pellets and the catalyst is added to the pellets prior to injection molding of a shape from the temperature stable polymeric blend. According to such embodiments, the catalyst may be added pre-mixed with the pellets of the blend prior to addition to an injection molding apparatus or may be added along with the pellets of the blend to a mixer or hopper which forms a part of the injection molding apparatus.

Properties of the Temperature Stable Polymeric Blend

According to the first-fourth embodiments, the properties of the temperature stable polymeric blend may vary. In certain embodiments of the first-fourth embodiments, the temperature stable polymeric blend will meet at least one of the following: (a) a maximum stress (also referred to as stress at break or Tb) of at least 10 MPa (e.g., 10, 11, 12, 13, 14, 15, 16, 17, 18, 19, 20, 25, 30, 35, 40, 45, 50 MPa or higher), preferably at least 11 MPa (e.g., 11, 12, 13, 14, 15, 16, 17, 18, 19, 20, 25, 30, 35, 40, 45, 50 MPa or higher) or at least 12 MPa (e.g., 12, 13, 14, 15, 16, 17, 18, 19, 20, 25, 30, 35, 40, 45, 50 MPa or higher), (b) an elongation at break (also referred to as Eb) of at least 90% (e.g., 90%, 95%, 100%, 105%, 110%, 120%, 130%, 150%, 160%, 170%, 180%, 190%, 200%, 210%, 220%, 230%, 240%, 250%, 260%, 270%, 280%, 290%, 300% or more), preferably at least 100% (e.g., 90%, 95%, 100%, 105%, 110%, 120%, 130%, 150%, 160%, 170%, 180%, 190%, 200%, 210%, 220%, 230%, 240%, 250%, 260%, 270%, 280%, 290%, 300% or more), (c) M50 of at least 10 MPa (e.g., 10, 11, 12, 13, 14, 15, 16, 17, 18, 19, 20 MPa or higher), preferably at least 11 MPa (e.g., 11, 12, 13, 14, 15, 16, 17, 18, 19, 20 MPa or higher) or at least 12 MPa (e.g., 12, 13, 14, 15, 16, 17, 18, 19, 20 MPa or higher), (d) M100 of at least 10 MPa (e.g., 10, 11, 12, 13, 14, 15, 16, 17, 18, 19, 20, 21, 22, 23, 24, 25 MPa or higher), preferably at least 11 MPa (e.g., 11, 12, 13, 14, 15, 16, 17, 18, 19, 20, 21, 22, 23, 24, 25 MPa or higher) or at least 12 MPa (e.g., 12, 13, 14, 15, 16, 17, 18, 19, 20, 21, 22, 23, 24, 25 MPa or higher), or (e) a toughness (measured as the integral of area under the curve at tensile rupture with x axis in mm/mm) of at least 8 MPa % (e.g., 8, 9, 10, 11, 12, 13, 14, 15, 16, 17, 18, 19, 20, 25, 30, 35, 40, 45, 50, 55, 60, 65, 70, 75, 80, 85 90 MPa % or higher), preferably at least 9 MPa % (e.g., 9, 10, 11, 12, 13, 14, 15, 16, 17, 18, 19, 20, 25, 30, 35, 40, 45, 50, 55, 60, 65, 70, 75, 80, 85, 90 MPa % or higher) or at least 10 MPa % (e.g., 10, 11, 12, 13, 14, 15, 16, 17, 18, 19, 20, 25, 30, 35, 40, 45, 50, 55, 60, 65, 70, 75, 80, 85, 90 MPa % or higher). Measurements of Eb and Tb provide an indication of a rubber composition's tear resistance, which is particularly relevant when it is incorporated into a tire component. The abbreviation M50 is used for tensile stress at 50% elongation and the abbreviation M100 is used for tensile stress at 100% elongation. These values are sometimes referred to as modulus at 50% and modulus at 100%, although they do not represent true modulus measurements. Toughness refers to the ability of a material to withstand or resist fracturing. The foregoing properties (i.e., Eb, Tb, M50, M100, toughness) can be determined using the standard procedure described in ASTM D-412. Specimens are strained at a constant rate (of 20% per second) and the resulting force is recorded as a function of extension (strain). Properties are determined with testing at 23° C. (room temperature). Samples may be cured for 8-16 hours at an elevated temperature (between about 105 and 155° C.). After curing, samples for room temperature testing may be conditioned by allowing them to sit in the lab for at least 24 hours at room temperature before performing room temperature testing.

In certain embodiments of the first-fourth embodiments, the temperature stable polymeric blend exhibits at least one of the following: (a) a ratio of log storage modulus G' at 175° C. to log storage modulus G' at −40° C. that is no less than 1:150 (e.g., 1:150, 1:140, 1:130, 1:120, 1:110, 1:100, 1:90, 1:80, 1:70; 1:60; 1:50; 1:40, 1:30, 1:20, 1:10, 1:5, or more), preferably no less than 1:100 (e.g., 1:100, 1:90, 1:80, 1:70; 1:60; 1:50; 1:40, 1:30, 1:20, 1:10, 1:5, or more), more preferably no less than 1:20 (e.g., 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, or more), or (b) a strain-controlled cyclic fatigue performance of maintaining at least 95% of its tensile strength (e.g., 95%, 95.5%, 96%, 96.5%, 97%, 97.5%, 98%, 98.5%, 99%, 99.5%, or more) for at least 100 million cycles (this performance can be measured by cyclic loading between positive (15%) tension and negative (15%) compression at a frequency of 10 Hz at 25° C., where the tensile strength is the force in Newtons required to maintain the strain). In certain embodiments of the first-fourth embodiments, the ratio of log storage modulus G' at 175° C. to log storage modulus G' at −40° C. is 1:150 to 1:10 or 1:150 to 1:5, preferably 1:100 to 1:5, more preferably 1:20 to 1:5. Notably, the foregoing ratios are described as "no less than" since they can be understood as becoming more preferred the closer they are to the ratio of 1:1 which would indicate a blend with no change in log storage modulus G' over the indicated temperature range. In certain embodiments of the first-fourth embodiments, the strain-controlled cyclic fatigue performance is maintained at 95-99%, 95-98%, 95-97%, 96-99%, 96-98%, or 96-97%, according to the conditions described above. In preferred embodiments of the first-fourth embodiments, both of (a) and (b) are met, preferably with the preferred range for (a), more preferably with the more preferred range for (a). The ratio of log storage modulus G' can be measured according to ASTM D5279-13. The strain-controlled cyclic fatigue performance can be measured using the guidance of ASTM 6606/6606M-12.

Processes for Preparing the Temperature Stable Polymeric Blend

As mentioned above, the second embodiment disclosed herein is directed to a process for preparing a temperature stable polymeric blend. Generally, the process of the second embodiment includes heat blending of (a) a thermoplastic polyester elastomer and (b) a crosslinking compound (each, as discussed above) at a temperature of about 200 to about 280° C. or 200 to about 280° C. (e.g., 200, 210, 220, 230, 240, 250, 260, 270, or 280° C.), preferably about 220 to about 260° C. (e.g., 220, 225, 230, 235, 240, 245, 250, 255, or 260° C.), to produce a blend. According to the process of the second embodiment, the blending occurs in an extruder, preferably a twin-screw extruder. Further according to the process of the second embodiment, the total amount of (a) and (b) is 100 parts, (b) is present in an amount of about 0.5 to about 15 parts or 0.5 to 15 parts (e.g., 0.5, 1, 2, 3, 4, 5, 6, 7, 8, 9, or 10 parts), preferably about 1 to about 10 parts or 1 to 10 parts (e.g., 1, 1.5, 2, 2.5, 3, 3.5, 4, 4.5, 5, 5.5, 6, 6.5, 7, 7.5, 8, 8.5, 9, 9.5, or 10 parts), and (a) is present in an amount of about 85 to about 99.5 parts or 85 to 99.5 parts (e.g., 85, 86, 87, 88, 89, 90, 91, 92, 93, 94, 95, 96, 97, 98, 99, or 99.5 parts), preferably about 90 to about 99 parts or 90 to 99 parts (e.g., 90, 90.5, 91, 91.5, 92, 92.5, 93, 93.5, 94, 94.5, 95, 95.5, 96, 96.5, 97, 97.5, 98, 98.5, or 99 parts). Further according to the process of the second embodiment, the thermoplastic polyester elastomer has at least one of: (i) a Tg of about 50 to about 100° C. or 50 to 100° C. (e.g., 50, 55, 60, 65, 70, 75, 80, 85, 90, 95, or 100° C.), preferably about 50 to about 80° C. or 50 to 80° C. (e.g., 50, 52, 54, 55, 56, 58, 60, 62, 64, 65, 66, 68, 70, 72, 74, 75, 76, 78, or 80° C.), or (ii) a melt temperature of about 200 to about 290° C. or 200 to 290° C. (e.g., 200, 210, 220, 230, 240, 250, 260, 270, 280, or 290° C.), preferably about 210 to about 250° C. or 210 to 250° C. (e.g., 210, 215, 220, 225, 230, 235, 240, 245, or 250° C.). In certain embodiments of the process of the second embodiment, each of (i) and (ii) are met, i.e., the thermoplastic polymer elastomer has both a Tg and a melt temperature falling within both the foregoing ranges or within both of the foregoing preferred ranges.

As mentioned above, the first embodiment disclosed herein is directed to a temperature stable polymeric blend. The temperature stable polymeric blend of the first embodiment may be prepared by a process according to the second embodiment as discussed generally herein or may be prepared by a process that differs from the process of the second embodiment. In other words, the temperature stable polymeric blend of the first embodiment should not be considered to be limited to a blend prepared by the process of the second embodiment.

In certain embodiments of the process of the second embodiment, the thermoplastic polyester elastomer and the crosslinking compound are pre-mixed prior to heat blending; in certain such embodiments, the pre-mixing comprises pre-mixing of pelleted or other solid forms of the thermoplastic polyester elastomer and crosslinking compound prior to their addition to the extruder. In other embodiments of the process of the second embodiment, the thermoplastic polyester elastomer and the crosslinking compound are not pre-mixed prior to heat blending; in certain such embodiments, the thermoplastic polyester elastomer and the crosslinking compound are added to a mixer or hopper which forms a part of the injection molding apparatus prior to application of any heat.

In certain embodiments of the process of the second embodiment, once the thermoplastic polyester elastomer and crosslinking compound have been heat blended, the blend is extruded, preferably to produce pellets of the temperature stable polymeric blend. An extruder that is fitted with a pelletizer or otherwise configured with a pelletizer can be useful in preparing the pellets. In other embodiments of the process of the second embodiment, the blend is extruded into a non-pelletized form (e.g., strands or rods).

Use of the Temperature Stable Polymeric Blend

The temperature stable polymeric blend (e.g., in pellet form) can be subjected to injection molding to prepare a shape from the pellets. Preferably, the injection molding takes place at a temperature of no more than about 265° C. or no more than 265° C. (e.g., 265, 260, 255, 250, 245, 240, 235, 230, 225, 220, 215, 210, 205, 200, 195, 190, 185, 180° C., or less), more preferably no than 240° C. (e.g., 240, 235, 230, 225, 220, 215, 210, 205, 200, 195, 190, 185, 180° C., or less); in certain such embodiments, the injection molding takes place at a temperature of 180 to 265° C. (e.g., 265, 260, 255, 250, 245, 240, 235, 230, 225, 220, 215, 210, 205, 200, 195, 190, 185, or 180° C.), more preferably 200 to 240° C. (e.g., 240, 238, 236, 235, 234, 232, 230, 228, 226, 225, 224, 222, 220, 218, 216, 215, 214, 212, 210, 208, 206, 205, 204, 202 or 200° C.). Controlling the temperature at which injection molding takes place (e.g., to a maximum temperature or range as discussed above) can be beneficial in avoiding potential degradation of the thermoplastic polyester elastomer.

A preferred use of the temperature stable polymer blend is the preparation (e.g., by injection molding) of a component for a non-pneumatic tire. Preferably, the component of the non-pneumatic tire is one or more spokes. As used herein, the term "spoke" should be understood as including both elongated spokes (such as disclosed and illustrated in U.S. Pat. No. 7,013,939) as well as interconnected web elements (such as disclosed and illustrated in U.S. Pat. Nos. 8,104,524 and 8,176,957). Generally, however, the spokes that are disclosed herein should not necessarily be considered to be limited to any particular shape or configuration in a non-pneumatic tire. It should be considered that the following are fully disclosed herein. Pellets made from the temperature stable polymeric blend of the first embodiment. Rods or strands made from the temperature stable polymeric blend of the first embodiment. A non-pneumatic tire spoke made from the temperature stable polymeric blend of the first embodiment, where the spoke is preferably made by injection molding. A process for preparing a non-pneumatic tire spoke by injection molding the temperature stable polymeric blend of the first embodiment, preferably in pellet form. A non-pneumatic tire incorporating one or more spokes made by a process of injection molding the temperature stable polymeric blend according to the first embodiment disclosed herein), wherein the blend is preferably in pellet form prior to injection molding. A process for preparing a non-pneumatic tire including preparing one or more spokes by injection molding the temperature stable polymeric blend of the first embodiment, preferably in pellet form. A non-pneumatic tire incorporating one or more spokes made by a process of compression molding the temperature stable polymeric blend according to the first embodiment disclosed herein), wherein the blend is preferably in pellet form prior to compression molding. A process for preparing a non-pneumatic tire spoke by compression molding the temperature stable polymeric blend of the first embodiment, preferably in pellet form. A non-pneumatic tire incorporating one or more spokes made by a process of blow molding the temperature stable polymeric blend according to the first embodiment disclosed herein), wherein the blend is preferably in pellet form prior to blow molding. A process for preparing a non-pneumatic tire including preparing one or more spokes by blow molding the temperature stable polymeric blend of the first embodiment, preferably in pellet form. A non-pneumatic tire incorporating one or more spokes made by a process according to the second embodiment which includes blow molding of the blend produced by the process. A process for preparing a non-pneumatic tire by blow molding the temperature stable polymeric blend of the first embodiment, preferably in pellet form. A non-pneumatic tire spoke made by a process according to the second embodiment which process includes 3-D printing (or additive manufacturing) of the blend produced by the process, wherein the blend is preferably in pellet form prior to printing/manufacturing. A process for preparing a non-pneumatic tire spoke by 3-D printing (or additive manufacturing) the temperature stable polymeric blend of the first embodiment, wherein the blend is preferably in pellet form prior to printing/manufacturing. A non-pneumatic tire incorporating one or more spokes made by a process of 3-D printing (or additive manufacturing) the temperature stable polymeric blend according to the first embodiment disclosed herein), wherein the blend is preferably in pellet form prior to printing/manufacturing. A process for preparing a non-pneumatic tire including preparing one or more spokes by 3-D printing of (or additive manufacturing of) the temperature stable polymeric blend of the first embodiment, wherein the blend is preferably in pellet form prior to printing/manufacturing. Pellets made from a temperature stable polymeric blend produced by the process of the second embodiment. Strands or rods made from a temperature stable polymeric blend produced by the process of the second embodiment. A non-pneumatic tire spoke made by a process according to the second embodiment which process includes injection molding of the blend produced by the process. A non-pneumatic tire incorporating one or more spokes made by a process according to the second embodiment which includes injection molding of the blend produced by the process. A non-pneumatic tire spoke made by a process according to the second embodiment which process includes compression molding of the blend produced by the process. A non-pneumatic tire incorporating one or more spokes made by a process according to the second embodiment which includes compression molding of the blend produced by the process. A non-pneumatic tire spoke made by a process according to the second embodiment which process includes blow molding of the blend produced by the process. A non-pneumatic tire incorporating one or more spokes made by a process according to the second embodiment which includes blow molding of the blend produced by the process. A non-pneumatic tire spoke made by a process according to the second embodiment which process includes 3-D printing (or additive manufacturing) of the blend produced by the process. A non-pneumatic tire incorporating one or more spokes made by a process according to the second embodiment which includes 3-D printing (or additive manufacturing) of the blend produced by the process.

In those embodiments of the first-fourth embodiments wherein the crosslinking agent of the temperature stable polymeric blend is an epoxy compound and an injection molded shape is made from the blend (e.g., according to the process discussed above), it may be beneficial to subject the injection molded shape to heat treatment for a period of time. Use of such a heat treatment may be useful in achieving a complete curing of the shape. The need for any heat treatment step may be dependent upon various factors, such as the type of catalyst used in conjunction with the epoxy crosslinking compound. As those of skill in the art will appreciate, different catalysts will react with the epoxy functionality at different temperatures and at different relative speeds. In certain embodiments, the heat treatment of the injection molded shape comprises heating to a temperature of at least about 100° C. or at least 100° C. (e.g., 100, 105, 110, 115, 120, 125, 130, 135, 140° C., more), preferably for at least about 8 hours or at least 8 hours (e.g., 8, 12, 16, 18, or 24 hours). In preferred embodiments where heat treating is utilized, the heat treatment of the injection molded shape comprises heating to a temperature of about 100 to about 125° C. or 100 to 125° C. (e.g., 100, 105, 110, 115, 120, or 125° C.), preferably for about 8 to about 16 hours or for 8 to 16 hours (e.g., 8, 10, 12, 14, 16, 18, 20, 22, or 24 hours).

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." All references, including but not limited to, patents, patent applications, and non-patent literature are hereby incorporated by reference herein in their entirety. While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A non-pneumatic tire comprising a component made from a temperature stable polymeric blend comprising:
   a. a thermoplastic polyester consisting of a polyether-polyester block copolymer elastomer having:
      i. a Tg of about 50 to about 100° C., and
      ii. a melt temperature of about 200 to about 290, and
   b. a crosslinking compound comprising an epoxide compound or a siloxane compound, wherein the siloxane compound contains at least one unsaturated carbon-carbon bond or at least one sulfur atom,
   wherein the total amount of (a) and (b) is 100 parts and (b) is present in an amount of about 0.5 to about 15 parts and (a) is present in an amount of about 85 to about 99.5 parts,
   wherein no more than 5% by weight, based upon the total weight of (a) and (b), of a high temperature thermoplastic polymer having a Tg of 200° C. or higher and/or a melt temperature of 300° C. or higher is present in the blend, and
   wherein temperature stable refers to the ability of the blend to maintain at least 90% of its Modulus over a temperature range of −40 to 190° C., where Modulus refers to at least one of 50% Modulus or 100% Modulus.

2. The non-pneumatic tire of claim 1, wherein the polymeric blend exhibits at least one of:
   i. a ratio of log storage modulus G' at 175° C. to log storage modulus G' at −40° C. that is no less than 1:150 or
   ii. a strain-controlled cyclic fatigue performance of maintaining at least 95% of its tensile strength for at least 100 million cycles.

3. The non-pneumatic tire of claim 2 wherein the component is one or more spokes.

4. The non-pneumatic tire of claim 1, wherein no more than 1% by weight, based upon the total weight of (a) and (b), of the high temperature thermoplastic polymer having a Tg of 200° C. or higher and/or a melt temperature of 300° C. or higher is present in the blend.

5. The non-pneumatic tire of claim 4 wherein the component is one or more spokes.

6. The non-pneumatic tire of claim 1, wherein (a) comprises a polyalkylene-terephthalate-polyalkylene ether glycol copolymer or a polyalkylene naphthalate-polyalkylene ether glycol copolymer.

7. The non-pneumatic tire of claim 6 wherein the component is one or more spokes.

8. The non-pneumatic tire of claim 1, wherein the thermoplastic polyester elastomer includes at least one carbon-carbon double bond in the polyester portion and the crosslinking compound is a siloxane compound containing at least one unsaturated carbon-carbon bond selected from compounds having one of alkoxysilane, polysiloxane, or halogenated-silane as the siloxane portion of the crosslinking agent.

9. The non-pneumatic tire of claim 8, wherein the at least one carbon-carbon double bond of the siloxane compound is present in a vinyl group bonded to the Si of the siloxane or an allyl group bonded to the Si of the siloxane.

10. The non-pneumatic tire of claim 9 wherein the component is one or more spokes.

11. The non-pneumatic tire of claim 8 wherein the component is one or more spokes.

12. The non-pneumatic tire of claim 1, wherein the thermoplastic polyester elastomer includes at least one carbon-carbon double bond in the polyester portion and the crosslinking compound is a siloxane compound containing at least one sulfur atom.

13. The non-pneumatic tire of claim 12 wherein the component is one or more spokes.

14. The non-pneumatic tire of claim 1, wherein the crosslinking compound is an epoxidized plant oil, a polyepoxide compound, or a combination thereof.

15. The non-pneumatic tire of claim 14 wherein the component is one or more spokes.

16. The non-pneumatic tire of claim 1, wherein the crosslinking compound is a siloxane compound having at least one sulfur atom, and the blend further comprises a radical generator selected from peroxide compounds, azo compounds, persulfate compounds, perborate compounds, and percarbonate compounds.

17. The non-pneumatic tire of claim 16 wherein the component is one or more spokes.

18. The non-pneumatic tire of claim 1, wherein at least one of the following is met:
   a. the blend has a modulus E' at 25° C. between 50 and 100 MPa, or
   b. the blend is processable via injection molding at a temperature of 275° C. or less.

19. The non-pneumatic tire of claim 18 wherein the component is one or more spokes.

20. The non-pneumatic tire of claim 1 wherein the component is one or more spokes.

* * * * *